Dec. 15, 1942.   D. S. MEYERS ET AL   2,305,437
RANGE FINDER FOR CAMERAS
Filed Dec. 20, 1939   3 Sheets-Sheet 1
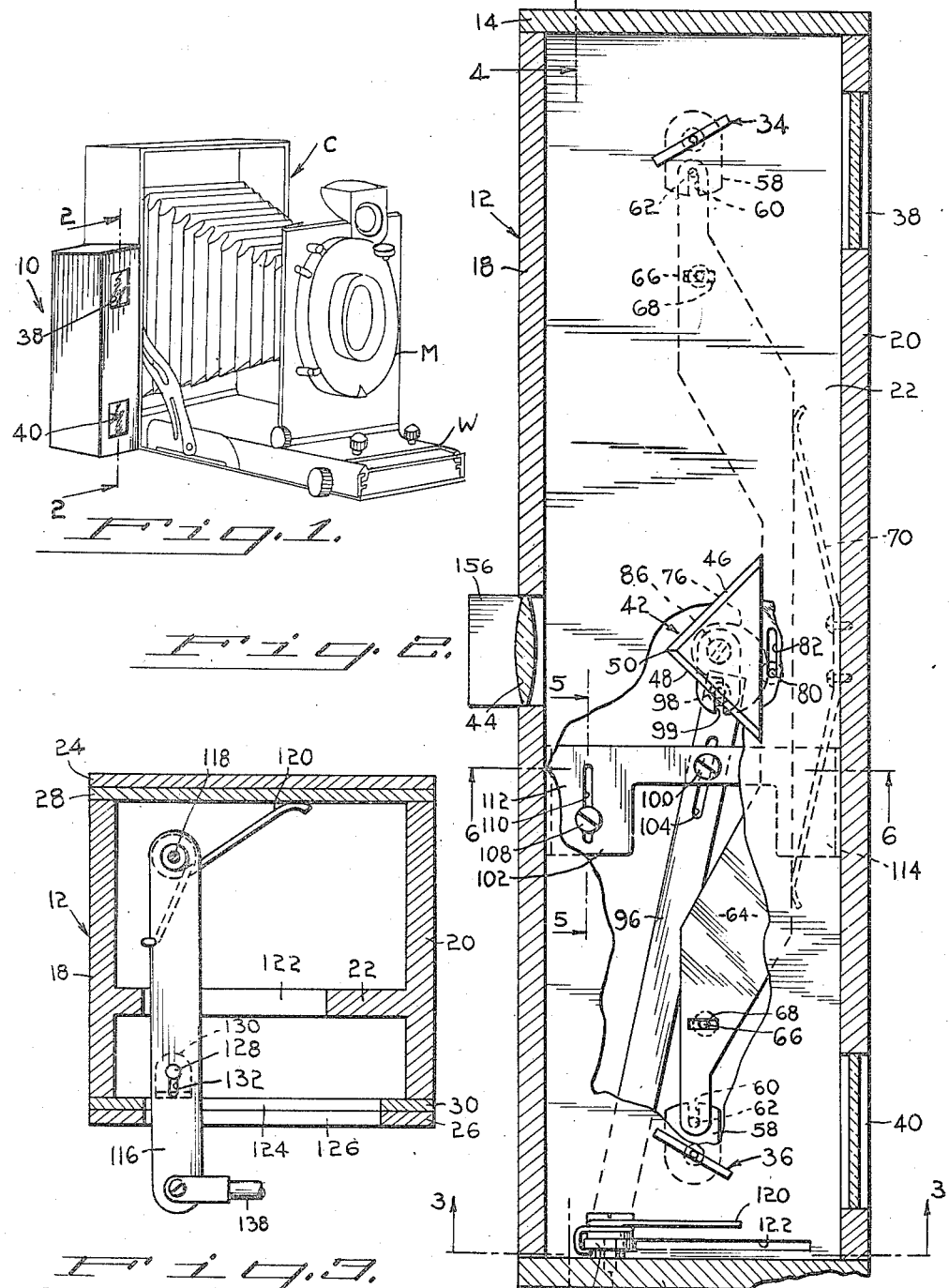
INVENTORS.
DANIEL S. MEYERS and DELL J. EVANS
BY
ATTORNEY.

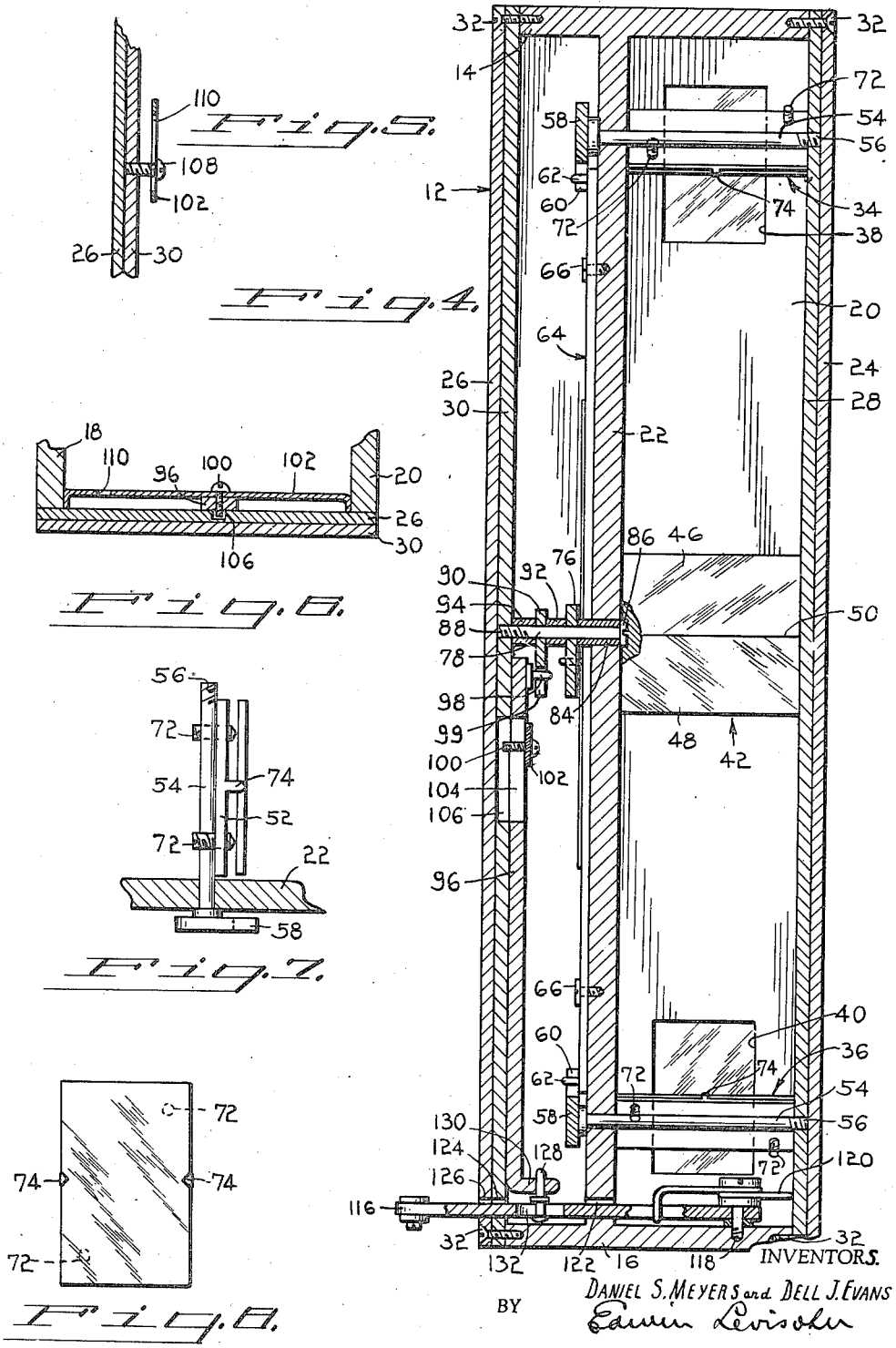

Dec. 15, 1942.  D. S. MEYERS ET AL  2,305,437
RANGE FINDER FOR CAMERAS
Filed Dec. 20, 1939    3 Sheets-Sheet 3
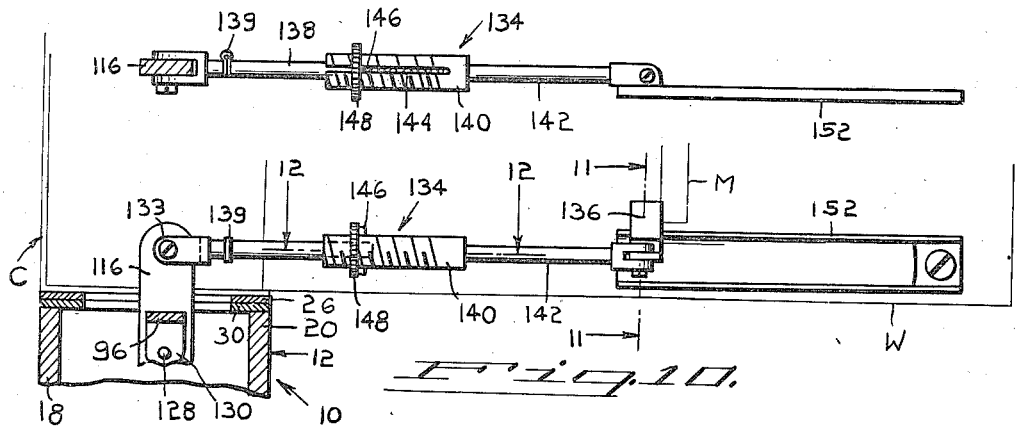
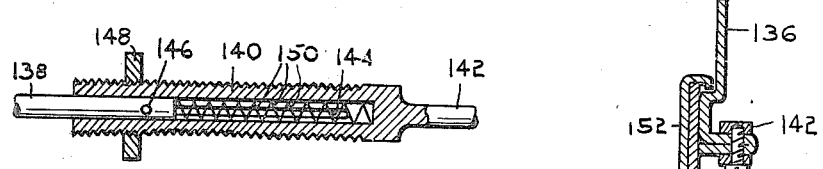
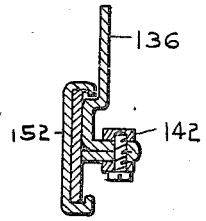
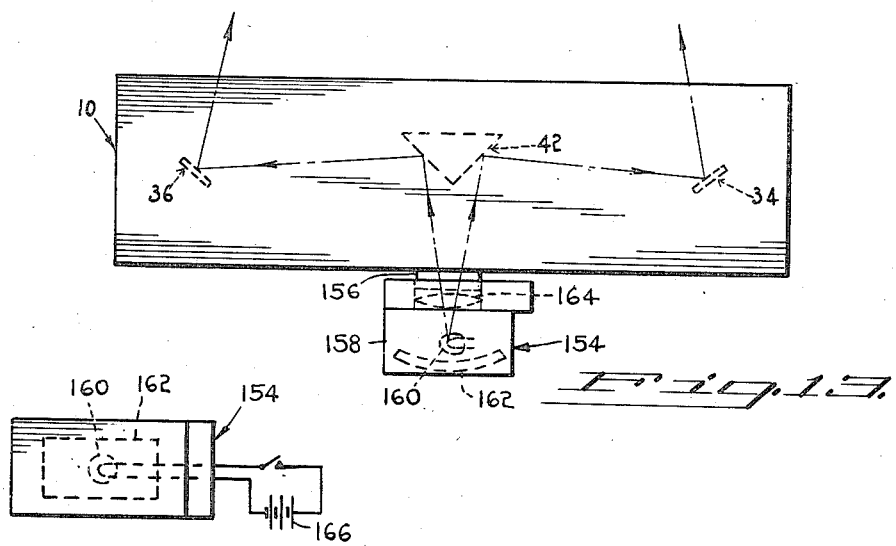
INVENTORS
DANIEL S. MEYERS and DELL J. EVANS
BY
ATTORNEY.

Patented Dec. 15, 1942

2,305,437

UNITED STATES PATENT OFFICE 2,305,437

RANGE FINDER FOR CAMERAS

Daniel S. Meyers and Dell J. Evans,
Los Angeles, Calif.

Application December 20, 1939, Serial No. 310,170

5 Claims. (Cl. 95—44)

This invention relates to range finders for cameras.

One object of the invention is to provide an optical range finder which is simple in construction and easy to operate either for determining the adjustment of the camera lens for focusing the camera or when combined with the camera to automatically adjust the lens of the camera for focusing the same when the range finder is operated.

Another object of the invention is to provide a range finder which can be used in night photography or when the light is insufficient to allow for the normal operation of the range finder by observation of reflected images of the article to be photographed.

A yet further object of the invention is generally to provide a range finder of improved construction and reliable operation.

Briefly described, the range finder of the present invention comprises two reflectors, preferably plane mirrors, mounted for turning movement and located at equal distances from a pair of plane mirrors arranged in V formation. Said two plane mirrors are disposed in angular relation, with their reflecting surfaces meeting on a straight line in a plane parallel to the planes in which the turning axes of the first mentioned mirrors are located. The reflecting surfaces of said angularly related mirrors are located in the paths of reflection of said first mentioned mirrors, respectively, and confront an observation opening or eyepiece whereby the light or images reflected by said first mentioned mirrors are transmitted to said pair of mirrors and are reflected by the latter for observation. For convenience in reference the first mentioned adjustable mirrors will be designated as end mirrors and the pair of angularly related mirrors will be designated as the central or intermediate mirrors.

The end mirrors are adjusted in synchronization by suitable mechanism, either under the control of the camera lens mounting or independently of the latter. By varying the angular adjustment of the two end mirrors, images of an object to be photographed and reflected by said end mirrors to said pair of mirrors can be selectively located on said central mirrors, respectively, so that the images on the latter meet at the line of intersection of said central mirrors when the latter are observed by one eye through the observation opening or eyepiece. When the images on the center mirrors thus meet at the center line the camera is in focus, when, on the one hand, as hereinbefore stated, the adjustment of the end mirrors is accomplished by movement of the camera lens. On the other hand, when the range finder is operated independently of the camera a reading on a dial on the range finder will indicate the setting of the camera lens for focusing the camera.

When the range finder is to be used at night or where the light is insufficient, a beam or pencil of light from a lamp housing or other light source is projected through said eyepiece or opening, normally used for observation, to the central mirrors at said line of intersection thereof. The pair of mirrors then transmit a beam of light to each of the end mirrors which in turn reflect said light beams toward the object to be photographed. By adjusting said end mirrors the two beams or pencils of light reflected thereby can be made to merge in one spot of light on the object to be photographed, and when this occurs, the camera is in focus or can be set in focus in accordance with the reading on the scale with which the range finder can be provided.

The invention, and the above mentioned and other objects thereof which might hereinafter appear will be best understood from the following description considered in connection with the accompanying drawings which illustrate the preferred embodiment of the invention. It is to be understood, however, that the drawings are to be considered only as illustrative of the invention and not in limitation thereof.

In the drawings:

Fig. 1 is a perspective view of a camera provided with a range finder embodying the present invention;

Fig. 2 is a sectional view of the range finder, on a larger scale, on the line 2—2 of Fig. 1 with parts cut away for illustrative purposes;

Fig. 3 is a sectional view on the line 3—3 of Fig. 1;

Fig. 4 is a sectional view on the line 4—4 of Fig. 2;

Figs. 5 and 6 are detail sectional views on the lines 5—5 and 6—6, respectively, of Fig. 1;

Figs. 7 and 8 are end and front views, respectively, of the mounting of an end mirror;

Fig. 9 is a side view of the mechanism arranged to be actuated pursuant to the adjustment of the camera lens for operating the range finder;

Fig. 10 is a top view of the mechanism illustrated in Fig. 8;

Figs. 11 and 12 are sectional views on the lines 11—11 and 12—12, respectively, of Fig. 10;

Fig. 13 is a view illustrating the attachment of a lamp housing for operating the range finder at night or where the light is insufficient;

Fig. 14 is a view of the lamp housing detached from the range finder and showing also the connection of the lamp with a battery.

Referring now to the drawings in detail, the range finder 10 embodying the present invention is, as here shown in Fig. 1, attached to a camera C having an adjustable lens mounting M movable longitudinally of a track on the pivoted front cover for focusing the camera. Preferably, as will hereinafter be described, a mechanism is connected to the range finder and is disposed in position to be actuated in the adjustment of the lens mounting M whereby the camera is automatically focused in the operation of the range finder. On the other hand, the range finder may be operated independently of the camera and the lens mounting thereafter set to focus the camera in accordance with the indication determined by the operation of the range finder.

The range finder 10 comprises a casing 12, preferably but not necessarily of metal. Said casing comprises as here shown a metal casting having end walls 14 and 16, front and rear walls 18 and 20, respectively, and an intermediate or partition wall 22. Said casing also includes side walls 24 and 26 and companion inner mounting plates 28 and 30, respectively, as clearly shown in Figs. 3 and 4. Said side walls and companion mounting plates are removably secured to the casting of the casing in any suitable way as by screws 32. Said mounting plates are made as light as possible by the provision therein of cutouts in the portions thereof which are not needed. The end mirrors 34 and 36 are mounted for adjustment in alignment with openings or light passages 38 and 40, respectively, provided in wall 20. The center or V-mirrors 42 are positioned centrally between end mirrors 34 and 36 in alignment with an observation opening or eyepiece 44 provided in wall 18. V-mirror 42 comprises a pair of mirrors 46 and 48 disposed in angular relation with a miter joint and with their reflecting surfaces meeting at a fine center line 50 disposed centrally of observation opening 44, as clearly shown in Fig. 2. The reflecting surfaces of mirrors 46 and 48 are in the path of the reflections of end mirrors 34 and 36, respectively. V-mirror 42 is fixed in position between intermediate wall 22 and mounting plate 28 and is maintained stationary in said position. End mirrors 34 and 36 are mounted for turning movement about axes parallel to the planes of mirrors 46 and 48. As the mountings of mirrors 34 and 36 are the same, only one of said mountings need be described. Thus, as here shown, each end mirror is carried by a metal plate 52 fixed to a rod 54 for turning movement with the latter. Rod 54 is pivotally mounted at its ends in plate 28 and in partition wall 22. The outer end 56 of rod 54 is in screw-threaded engagement with mounting plate 28 for holding said rod against substantial longitudinal movement without interfering with the turning movement thereof. The inner end of rod 56 projects through partition wall 22 and is provided with a crank arm 58 fixed thereto.

Each crank arm has a slot 60 which receives a pin 62 carried by the adjacent end of an operating plate 64. Said operating plate is mounted for sliding movement in engagement with partition wall 22 and is guided for said movement by pins 66 threaded into partition wall 22 and passing through slots 68 in said operating plate. A spring 70 is secured to wall 20 and bears on the adjacent or confronting edge of plate 64 for holding the latter in predetermined position and for resiliently opposing movement of said plate in one direction. As illustrated in Figs. 7 and 8, the end mirrors are adjustably mounted on companion plates 52 for aligning said mirrors with the center V-mirror 42. For this purpose adjusting screws 72 are arranged and engage the rear surface of each end mirror for adjusting the same while the latter is held by prongs 74 of supporting plate 52.

The mechanism for actuating plate 64 to adjust the end mirrors will now be described. Said mechanism comprises a cam 76 fixed to a pin 78 and turnable with the latter in engagement with the cam pin-follower 80 carried by plate 64 and adjustable in a slot 82 provided in said plate. Pin 78 is mounted for turning movement. For this purpose, a sleeve 84 is provided in plate 22 for the inner end of pin 78. Said inner end is journalled in said sleeve and is provided with a slotted head 86. The outer end 88 of said pin is in threaded turning engagement with mounting plate 30 as clearly shown in Fig. 4. A crank arm 90 is fixed to pin 78 for rotating the latter and is positioned thereon between spacing collars 92 and 94. Crank arm 90 is actuated by a lever 96 which is provided at one end thereof with a pin 98 which engages crank arm 90 in a slot 89 therein. Lever 96 is fulcrumed intermediate the ends thereof on a pivot pin 100 carried by an adjustable plate 102 and passing through a slot 104 in said lever. The end of pin 100 also extends through a slot 106 in mounting plate 30. Adjustable plate 102 is secured adjustably in position by a screw 108 passing through a slot 110 in said plate and threaded into mounting plate 30. The ends 112 and 114 of plate 102 are in slidable engagement with walls 18 and 20, respectively. By adjusting plate 102 longitudinally of said walls, the fulcrum pin 100 of lever 96 is likewise adjusted thereby to provide for the adjustment of the mechanism for lenses of different focal-lengths.

Provision is made for actuating lever 96 simultaneously with the setting of the lens mounting of the camera. The mechanism provided for this purpose comprises a lever 116 pivotally mounted at one end thereon on a pivot screw 118 threaded into the end wall 16. A spring 120 is positioned on pivot screw 118 and engages lever 116 and mounting plate 28 for opposing movement of said lever and for returning the same to initial position. Said lever projects through a slot 122 in partition wall 22 and through companion slots 124 and 126 in mounting plate 30 and wall 26, respectively. Said lever is connected to lever 96 by a pin 128 fixed to the upturned end 130 of lever 96 and slidably connected to lever 116 in a slot 132 of the latter. The outer end of lever 116 projects into the camera casing and is pivotally connected at 133 to a telescoping link mechanism 134 (Figs. 9 and 10) which carries a sliding plate 136. Plate 136 is in position to be engaged by the lens mounting M whereby the adjustment of said lens mounting on the track thereof results in actuation of links 134, 116 and 96 for adjusting mirrors 34 and 36 for operating the range finder.

The telescoping link mechanism 134 is provided so that the front wall W on which the lens mounting is slidable can be closed when the lens mounting is fully retracted into the camera housing. Said telescoping link mechanism comprises a link 138 pivotally connected as at 139 and slidable in the tubular extension 140 of link 142 which carries plate 136. Tubular member 140 is threaded externally and has diametrically opposite longitudinally extending slots 144 through which there projects a transverse pin 146 carried by link 138. A nut 148 threaded on tubular member 140 provides an adjustable abutment for transverse pin 146. A spring 150 disposed within tubular member 140 bears at one end against the end of link 138 and at its other end against the inner end wall of tubular member 140. A guide track 152 is secured to wall W and extends longitudinally thereof in position to present plate 136 in the path of lens mounting M on the track therefor. It will be understood that while I have shown the range finder mounted on the camera and connected for operation by the adjustment of the lens mounting, said range finder can be operated independently of the camera and need not be mounted thereon, in which case, the linkage 134 is dispensed with and link 116 actuated manually directly or indirectly by any suitable device in conjunction with a scale for indicating the setting of the camera lens.

In Fig. 13 we have shown the range finder provided with an illuminating device 154 to be used in conjunction with the range finder in night photography or where the light is insufficient for direct observation of images of the object to be photographed. Said illuminating device 154 is mounted removably on the range finder 12 and more particularly on the eyepiece tube 156 in position to transmit a beam of light to the V-mirror 42. Said illuminating device comprises a casing 158 in which an electric lamp 160 and a reflector 162 are mounted. Said casing 158 has a condensing lens 164 through which the light passes. In Fig. 14 a battery 166 is shown connected to lamp 160 for energizing the same. When device 154 is mounted on the range finder a beam of light is transmitted thereby centrally of V-mirror 42 and falls on mirrors 46, 48 thereof which reflect individual beams or pencils of light to end mirrors 34, 36, respectively. Said end mirrors reflect the beams of light through openings 38 and 40 to the object to be photographed. By adjusting said end mirrors, the beams of light reflected thereby can be brought together and merged into a single spot of light on the object to be photographed and when this occurs the optical range of the object is determined. When the range finder is mounted on the camera and actuated by the lens mounting thereof, as illustrated in Fig. 1, and as described above, the camera is in focus when the spot-merging of the beams of light on the object is accomplished. However, when the range finder is actuated independently of the camera the reading on the scale which may be provided will indicate the setting of the lens mounting for focusing the camera.

While we have shown and described the preferred embodiment of our invention, it will be understood that the latter may be embodied otherwise than as herein shown and that certain changes in the details of construction and in the arrangement of parts may be made in the range finder. Also it will be understood, that the range finder can be mounted at the top of the camera or in some other position. When the range finder is mounted on the top of the camera the lever 116 will project through an opening in the casing of the camera and will extend to a position slightly above the casing wall to which the front closure is pivotally connected. Numerous other variations in the construction and in the arrangement of the range finder and in the association thereof with the camera may be made. Accordingly, I do not wish to be limited to the construction or arrangement herein shown or described except to the extent which may be required by the scope of the appended claims.

Having thus described our invention, what we claim and desire to secure by Letters Patent is:

1. A range finder comprising a casing, two mirrors disposed in spaced relation in said casing, pivoted members on which said mirrors are mounted, respectively, for turning movement thereof, a pair of mirrors arranged in angular relation with their reflecting surfaces meeting at a straight line, said pair of mirrors being mounted in said casing and disposed in such relation to said first mentioned mirrors that images of an object can be reflected by said first mentioned mirrors to said angularly related mirrors, respectively, for reflection by the latter, and means for turning said first mentioned mirrors for simultaneous movement thereof to positions for reflecting images of the object to said angularly related mirrors, respectively, for reflection by the latter, said means comprising arms fixed to said pivoted members, respectively, for turning the latter, a plate slidably mounted in said casing, said plate extending between said arms and engaging said arms, and means for imparting a sliding movement to said plate.

2. A range finder comprising a casing, two mirrors disposed in spaced relation in said casing, pivoted members on which said mirrors are mounted, respectively, for turning movement thereof, a pair of mirrors arranged in angular relation with their reflecting surfaces meeting at a straight line, said pair of mirrors being mounted in said casing and disposed in such relation to said first mentioned mirrors that images of an object can be reflected by said first mentioned mirrors to said angularly related mirrors, respectively, for reflection by the latter, means for turning said first mentioned mirrors to positions for reflecting images of the object to said angularly related mirrors, respectively, for reflection by the latter, said means comprising arms fixed to said pivoted members, respectively, for turning the latter, a plate slidably mounted in said casing, said plate extending between said arms and engaging said arms, a cam engageable with said plate for imparting a sliding movement thereto, and means for actuating said cam, and observation means adjacent said meeting line of said pair of mirrors for viewing the images reflected by the latter.

3. A range finder comprising a casing, two mirrors disposed in spaced relation in said casing, pivoted members on which said mirrors are mounted, respectively, for turning movement thereof, a pair of mirrors arranged in angular relation with their reflecting surfaces meeting at a straight line, said pair of mirrors and said first mentioned mirrors being disposed in image-reflecting relation, and means for turning said first mentioned mirrors to adjust the same in said image-reflecting relation, said means comprising arms fixed to said pivoted members, respectively, for turning the latter, a plate slidably mounted in said casing, said plate extending between said arms and engaging said arms, a cam engageable with said plate for imparting a sliding movement thereto, and a pivoted lever connected to said cam for actuating the latter.

4. A range finder comprising a casing, two mirrors disposed in spaced relation in said casing, pivoted members on which said mirrors are mounted, respectively, for turning movement thereof, a pair of mirrors arranged in angular relation with their reflecting surfaces meeting at a straight line, said pair of mirrors and said first mentioned mirrors being disposed in image-reflecting relation, means for turning said first mentioned mirrors to adjust the same in said image-reflecting relation, said means comprising arms fixed to said pivoted members, respectively, for turning the latter, a plate slidably mounted in said casing, said plate extending between said arms and engaging said arms, a cam engageable with said plate for imparting a sliding movement thereto, a pivoted lever connected to said cam for actuating the latter, and an adjustable pivot for said lever engageable therewith adjustably between the opposite ends of said lever.

5. A range finder comprising a casing having a viewing device, two mirrors disposed in said casing in spaced relation and each mounted for turning movement thereof, a pair of mirrors mounted in said casing and arranged in angular relation with their reflecting surfaces confronting said viewing device and meeting at a straight line and having their adjacent side edges terminating at said line, said pair of mirrors and said first mentioned mirrors being disposed in image-reflecting relation, a source of light adapted to be positioned in relation to said pair of mirrors for reflection by the latter of beams or pencils of light from said source to said first mentioned mirrors for reflection by the latter, means for turning said first mentioned mirrors to adjust the same in said image-reflecting relation, and means for removably mounting said source of light on said casing in registry with said viewing device whereby to transmit light from said source through said viewing device to said pair of mirrors and to permit ocular observation of said angularly related mirrors through said viewing device when said source of light is removed.

DANIEL S. MEYERS.
DELL J. EVANS.